(12) United States Patent   (10) Patent No.: US 7,742,668 B2
Nothofer et al.   (45) Date of Patent: Jun. 22, 2010

(54) SEMI-TIGHT OPTICAL FIBER UNIT

(75) Inventors: Klaus Nothofer, Erkrath (DE); Dick Huijsman, Wagenborgen (NL); Arnoldus Gertrudis Wilhelmus Marie Berkers, Appingedam (NL)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/963,048

(22) Filed: Dec. 21, 2007

(65) Prior Publication Data

US 2009/0010602 A1    Jan. 8, 2009

(30) Foreign Application Priority Data

Dec. 21, 2006 (NL) .................................... 1033101

(51) Int. Cl.
*G02B 6/44* (2006.01)
(52) U.S. Cl. .................. 385/109; 385/100; 385/102; 385/105; 385/106; 385/110; 385/112; 385/113
(58) Field of Classification Search ................ 385/100, 385/102, 105, 106, 109, 110, 112, 113
See application file for complete search history.

(56) References Cited

U.S. PATENT DOCUMENTS

| | | | | |
|---|---|---|---|---|
| 4,976,519 A | * | 12/1990 | Davey et al. ................. | 385/102 |
| 5,133,034 A | * | 7/1992 | Arroyo et al. ................ | 385/107 |
| 5,155,788 A | * | 10/1992 | Chapin et al. ................ | 385/104 |
| 5,181,268 A | | 1/1993 | Chien | |
| 5,243,675 A | | 9/1993 | Kathiresan et al. | |
| 5,264,251 A | | 11/1993 | Geursen et al. | |
| 5,389,442 A | * | 2/1995 | Arroyo et al. ................ | 428/396 |
| 6,137,936 A | * | 10/2000 | Fitz et al. .................... | 385/113 |
| 6,658,184 B2 | | 12/2003 | Bourget et al. | |
| 2002/0034367 A1 | * | 3/2002 | Gaillard et al. .............. | 385/113 |
| 2002/0168520 A1 | * | 11/2002 | Toler et al. ................... | 428/375 |
| 2004/0042743 A1 | | 3/2004 | Konstadinidis et al. | |
| 2004/0214943 A1 | | 10/2004 | Hager et al. | |
| 2005/0184411 A1 | | 8/2005 | Konstadinidis et al. | |
| 2006/0147163 A1 | | 7/2006 | Mayhew et al. | |

FOREIGN PATENT DOCUMENTS

| | | |
|---|---|---|
| EP | 0296836 A1 | 12/1988 |
| EP | 0482703 A1 | 4/1992 |
| EP | 0838703 A | 4/1998 |

(Continued)

OTHER PUBLICATIONS

Dutch Search Report and Written Opinion in corresponding Dutch Application No. NL 1033101, dated Sep. 24, 2007.

(Continued)

*Primary Examiner*—Ryan Lepisto
(74) *Attorney, Agent, or Firm*—Sumima, Additon & Ashe, P.A.

(57) ABSTRACT

Disclosed is a dry, semi-tight optical fiber unit that includes one or more optical fibers positioned within a buffer tube. A protective coating is provided upon the surface of the optical fibers, and an anti-adhesive coating is substantially bonded to the protective coating. One or more of these optical fiber units may be included in an optical cable. Also disclosed is a method for efficiently producing such an optical fiber unit.

27 Claims, 3 Drawing Sheets

FOREIGN PATENT DOCUMENTS

| | | | |
|---|---|---|---|
| EP | 0969301 | A | 1/2000 |
| EP | 1160607 | A1 | 12/2001 |
| EP | 1396745 | A | 3/2004 |
| EP | 1936417 | A1 | 6/2008 |
| GB | 2215480 | A | 9/1989 |
| WO | 2004/079424 | A | 9/2004 |
| WO | 2006/025645 | A | 3/2006 |

OTHER PUBLICATIONS

DSM Safety Data Sheet, Version: 1, pp. 1-6, (Oct. 31, 2006).
European Search Report in corresponding European Application No. 07024594, dated Apr. 4, 2008.

* cited by examiner

SEMI-TIGHT OPTICAL FIBER UNIT

CROSS-REFERENCE TO PRIORITY APPLICATION

This application claims the benefit of pending Dutch Application No. 1033101 (filed Dec. 21, 2006, at the Dutch Patent Office), which is hereby incorporated by reference in its entirety.

FIELD OF THE INVENTION

The present invention relates to a semi-tight or loose optical fiber unit that includes one or more optical fibers positioned within a buffer tube. A protective coating is provided upon the surface of the optical fibers, and an anti-adhesive coating is at least partially bonded to the protective coating.

BACKGROUND OF THE INVENTION

U.S. Pat. No. 6,658,184, which is hereby incorporated by reference in its entirety, discloses an exemplary optical fiber module that includes a plurality of optical fibers surrounded by a flexible tube, which is referred to as a protective skin. The gaps between the optical fibers in the flexible tube are generally occupied by a hydrophobic gel. The gel not only forms a moisture barrier but also prevents damage to the optical fiber and its protective coating (e.g., upon gaining access to the optical fiber).

One drawback of using grease or other gel-like material is that, during the installation of such optical modules, the grease or gel-like material tends to emerge from the optical cables, necessitating additional cleaning operations. Moreover, it is unpleasant for personnel to come into contact with grease or other gel-like material during optical cable installations.

European Patent Application No. EP 0,296,836 (and its counterpart U.S. Pat. No. 4,976,519, which is hereby incorporated by reference in its entirety) relate to an optical fiber cable that includes an inner sheath containing at least one optical fiber member, and an outer sheath surrounding the inner sheath. An intermediate sheath may be provided between the inner and outer sheaths. The inner sheath completely surrounds and is in tightly packed, direct contact with the optical fibers.

U.S. Pat. No. 5,181,268, which is hereby incorporated by reference in its entirety, discloses a tight-buffered optical waveguide that includes a solid lubricant, which purportedly improves strippability.

U.S. Patent Application Publication No. US 2002/0168520, which is hereby incorporated by reference in its entirety, relates to an optical fiber whose core is surrounded by a cladding, which in turn is surrounded by one or more layers of coating material.

There is a need, however, for an improved, semi-tight (or loose) optical fiber unit that is free of conventional water-blocking greases or grease-like gels.

SUMMARY OF THE INVENTION

Accordingly, it is an object of the present invention to provide a semi-tight (or loose) optical fiber unit that is free from conventional gel-like materials (e.g., water-blocking greases and such) within the interior of the optical fiber unit.

It is yet another object of the present invention to provide an optical fiber unit from which the surrounding buffer tube can be removed over a length of at least 100 centimeters without causing damage to the glass fiber or its surrounding protective coating (i.e., the primary and/or secondary coatings).

It is yet another object of the present invention to provide an efficient method for making a dry, semi-tight (or loose) optical fiber unit that includes one or more optical fibers.

The foregoing, as well as other objectives and advantages of the invention and the manner in which the same are accomplished, is further specified within the following detailed description and its accompanying drawing.

DETAILED DESCRIPTION

In one aspect, the present invention is an optical fiber unit that includes one or more optical fibers positioned within a buffer tube in a semi-tight or loose configuration.

As will be known by those having ordinary skill in the art, a conventional optical fiber includes a central glass fiber (e.g., a glass core and glass cladding) surrounded by one or more protective layers, such as an inner primary coating and an outer secondary coating. According to the present invention, an anti-adhesive coating envelopes (i.e., surrounds) at least one optical fiber's outermost protective layer (e.g., its secondary coating). A buffer tube loosely surrounds the one or more optical fibers (and their surrounding anti-adhesive coatings, if any). See FIGS. 1 and 2. Typically, each optical fiber positioned within the buffer tube is coated with an anti-adhesive material (i.e., a non-stick layer).

In general, the minimum cross-sectional inner diameter of the buffer tube is greater than the maximum cross-sectional diameter of the enclosed optical fibers (and any surrounding anti-adhesive coatings).

By way of example and in accordance with the present invention, where only one optical fiber is positioned with the buffer tube, the minimum inner diameter of the buffer tube is at least about six microns greater than the diameter of the optical fiber and its surrounding anti-adhesive coating.

In other words, an exemplary semi-tight optical fiber unit according to the present invention is capable of defining an annular space (i.e., between the anti-adhesive coating and the buffer tube) that is at least about three microns wide. Stated otherwise, there is a radial intermediate space (i.e., average radial separation or radial clearance) of about three microns or more between the anti-adhesive coating that surrounds an optical fiber and the buffer tube's inner boundary (i.e., inner surface).

Figure 1:
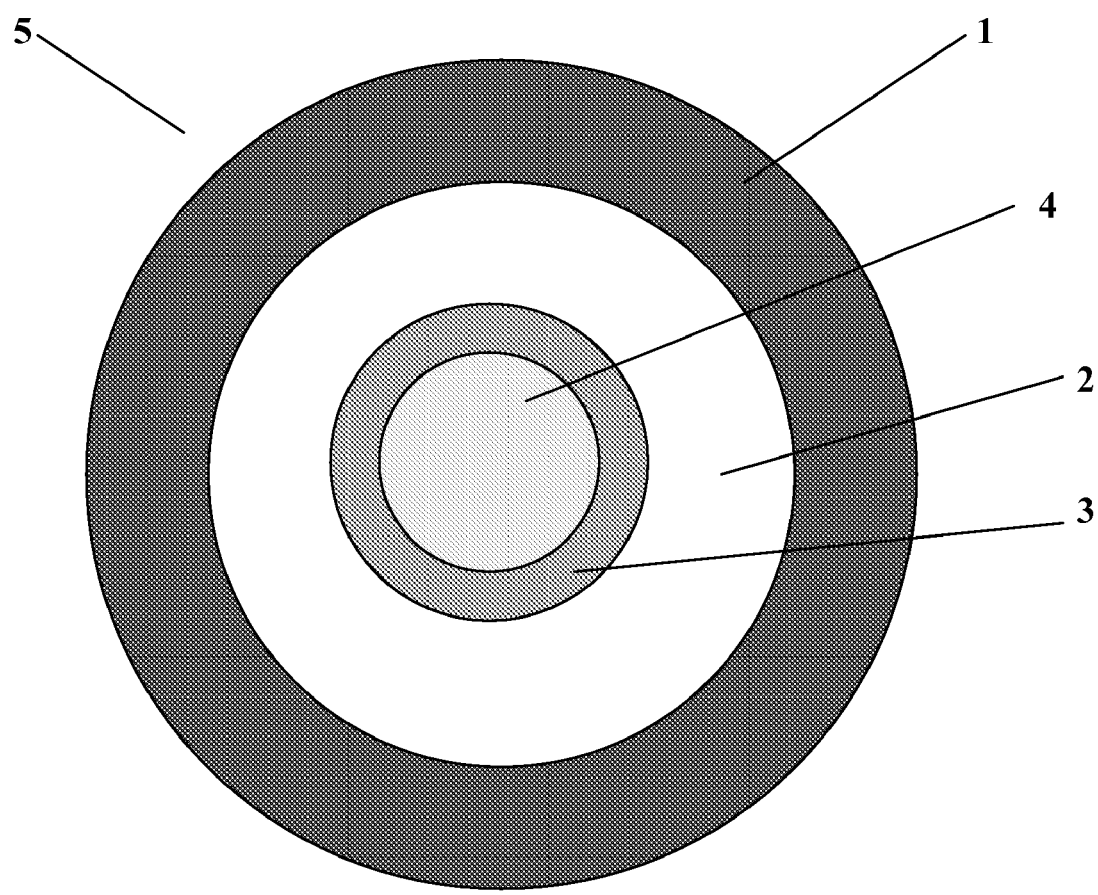
FIG. 1 schematically depicts a cross-sectional view of an exemplary, single-fiber optical fiber unit according to the present invention.
Figure 2:
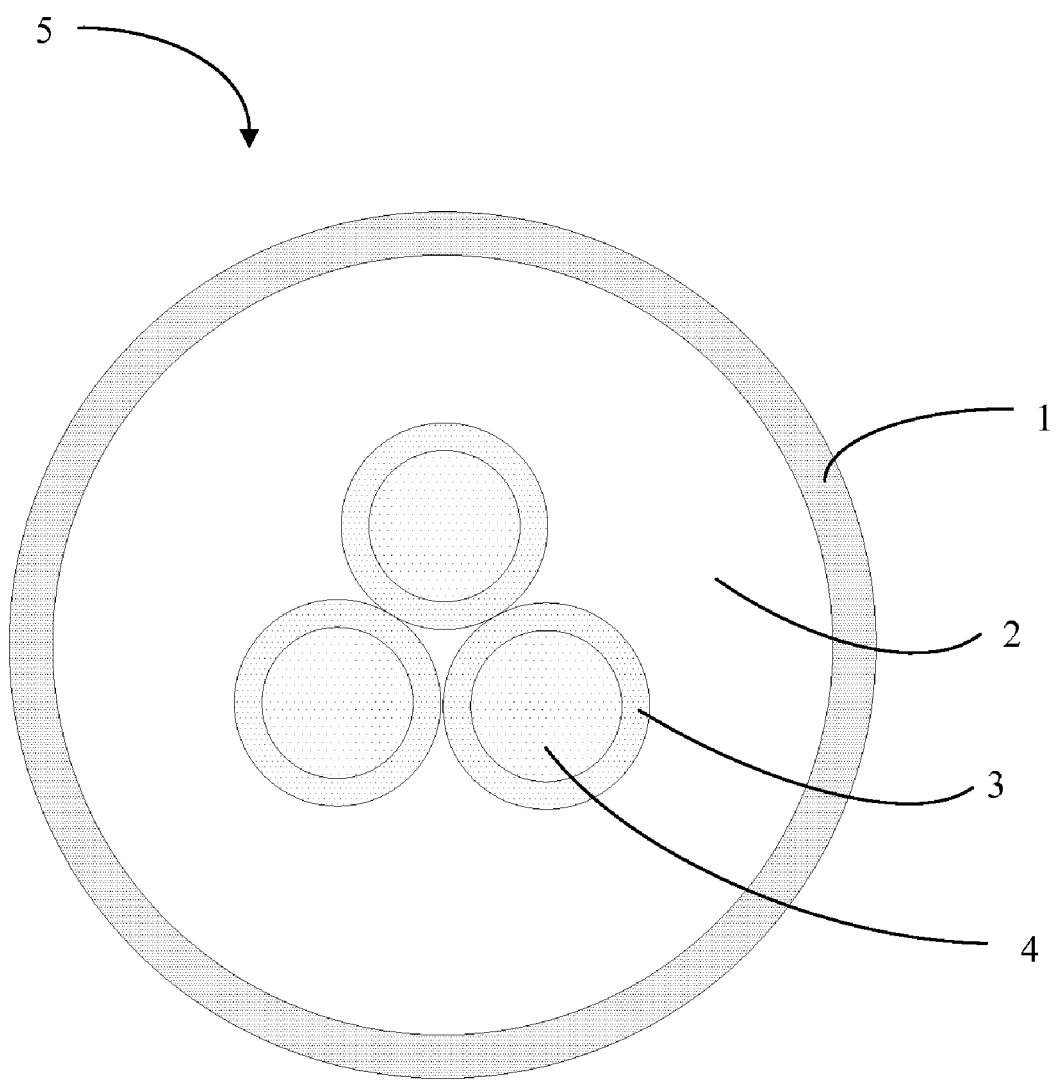
FIG. 2 schematically depicts a cross-sectional view of an exemplary, multi-fiber optical fiber unit according to the present invention.

FIG. 1 schematically depicts a cross-sectional view of an exemplary optical fiber unit 5 according to the present invention. A single optical fiber 4, which may be provided with one or more protective coatings (not shown), is surrounded by an anti-adhesive layer 3, which is bonded (at least partially if not completely) to the outer surface of the optical fiber 4. The anti-adhesive layer 3, in turn, is surrounded by a buffer tube 1 in a way that defines an intermediate space 2 (i.e., an annular space) between the inner circumference of the buffer tube 1 and the anti-adhesive coating 3.

Figure 3:
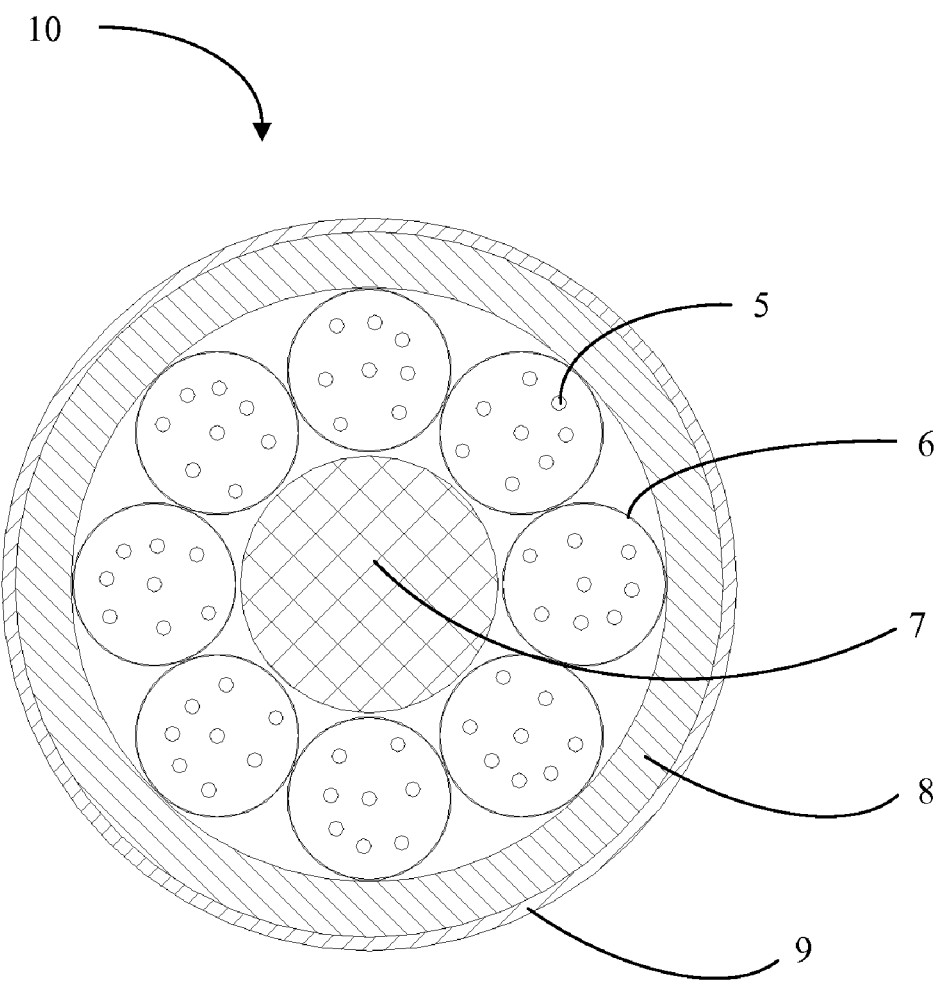
FIG. 3 schematically depicts a cross-sectional view of an exemplary optical cable with semi-tight (or loose) optical fiber units within tubes according to the present invention.

As herein described and schematically depicted in FIG. 3, one or more such optical fiber units 5 may be arranged in a dimensionally stable tube 6, which may be optionally wound around a central strengthening element 7. Moreover, one or more of such dimensionally stable tubes 6 may be positioned within an outer jacket 8, 9 (e.g., a cable sheath formed of one or more distinct layers).

It is also possible to strand one or more of such optical fiber units according to the present invention directly around a central strengthening element. Thereafter, an outer jacket may be provided around the optical fiber units.

As will be known to those having ordinary skill in the art, yarns, rip cords, and/or thin metal films (i.e., anti-rodent metal sheaths) may be present between the strengthening element and the surrounding fiber units and/or dimensionally stable tubes (i.e., as part of an optical cable).

Suitable anti-adhesive coatings according to the present invention include UV-curable resins, particularly acrylate-based resins possessing reactive silicone groups. Such anti-adhesive coatings bond well to an optical fiber's protective coating, yet resist subsequent bonding to the surrounding buffer tube. The anti-adhesive coating can be readily applied directly to an optical fiber's outer surface (e.g., the optical fiber's secondary coating). In a particular embodiment, the anti-adhesive coating is a thermosetting resin or an electron-beam curing resin. A suitable composition for use as an anti-adhesive coating according to the present invention is available from DSM Desotech (Elgin, Ill.) under the trade name CABLELITE 850-01 (PALAPREG H 850-01).

To provide better moisture resistance and longitudinal watertightness to the optical fiber unit, a material that will swell in the presence of water (e.g., a dry, powdered, superabsorbent polymer or SAP) can be provided within the radial intermediate space separating the buffer tube and the anti-adhesive coating.

The buffer tube is typically a thermoplastic material having high tensile strength, low shrinkage, and low linear coefficient of expansion. Suitable thermoplastic materials are polyolefins, such as polypropylene and polyethylene (e.g., linear low-density polyethylene (LLDPE) and high-density polyethylene (HDPE)). An exemplary buffer tube material is thermoplastic elastomer having flexible diol segments.

The optical fiber's central glass fiber includes a light-conducting core, which may be provided with dopants that influence the refractive index profile, and a surrounding glass cladding. The outer surface of the central glass fiber is usually provided with a protective coating, which may include one or more sublayers. As noted, the protective coating typically includes two distinct layers, namely a primary coating and a secondary coating. The primary coating contiguously surrounds (i.e., is in direct contact with) the central glass fiber's cladding layer, and the secondary coating directly surrounds the primary coating.

In accordance with the present invention, the anti-adhesive coating is applied to the optical fiber's outer protective coating (e.g., the secondary coating). In this regard, the adhesive coating may be formed by passing the optical fiber through a coating applicator in which an anti-adhesive coating composition is present (e.g., a liquid bath) and then passing the optical fiber through a curing station (i.e., curing the applied, liquid anti-adhesive composition in situ on the optical fiber).

Exemplary curing stations include UV ovens, heating ovens, and electron-beam chambers, depending on the kind of anti-adhesive coating to be cured, of course. Such curing stations may include several ovens arranged in series. The coating and curing of the anti-adhesive coating is typically performed off-line (i.e., in a step separate from the fiber drawing process). In contrast, the application of the protective coating (e.g., the optical fiber's primary and secondary coatings) is usually performed on-line (i.e., during the fiber drawing process). In this regard, the anti-adhesive coating is usually provided around the optical fiber with a "tight" fit (e.g., deposited or otherwise positioned directly on the optical fiber's outermost protective coating).

After the anti-adhesive coating has been provided, one or more optical fibers, enhanced with such an anti-adhesive coating, are positioned in a buffer tube (e.g., a single optical fiber or perhaps a bundle of 12 or more optical fibers). This buffering is typically achieved by extruding the buffer tube over the optical fibers. In this regard, the anti-adhesive coating reduces adhesion between the extruded buffer tube and the optical fibers, thereby promoting faster production rates. Thereafter, one or more of the present optical fiber units (i.e., buffer tube with the optical fibers arranged therein) can be joined into a cable.

In an exemplary embodiment, the protective coating of the optical fiber, typically the secondary coating, is colored to facilitate identification of the optical fibers. In this case, it is preferable to use a non-colored or transparent anti-adhesive coating in combination with a non-colored or transparent buffer tube. To the extent that the colored protective coating of the optical fiber is visible through the anti-adhesive coating and the buffer tube, identification of a particular optical fiber is easy.

In another alternative embodiment, the anti-adhesive coating is colored by adding pigments or colorants to the anti-adhesive coating. In this regard, the color can be provided in separate rings, as well as stripes or lines along the entire length of the optical fiber.

The thickness of the anti-adhesive coating is typically between about one and ten microns. This relatively thin coating reduces attenuation risks due to temperature cycling.

As previously described and shown in FIG. 3, the present invention embraces an optical cable that includes one or more optical fiber units 5 as described herein. In this regard, a plurality of optical fiber units 5 may be contained—typically freely contained (i.e., freely movable)—in a dimensionally stable tube 6. Moreover, one or more such dimensionally stable tubes 6 can be positioned within (i.e., surrounded by) a cable sheath 8, 9. Those having ordinary skill in the art will appreciate that within such optical cables the dimensionally stable tubes 6 may be "empty" as well as filled with one or more optical fiber units 5. In another cable embodiment, the present optical fiber units 5, which may or may not be contained in a dimensionally stable tube 6, are wound around a central strengthening element 7. In either case, a cable sheath 8, 9 typically completes the optical cable structure.

In yet another aspect, the present invention further relates to a method for manufacturing a semi-tight or loose optical fiber unit. In this regard, an anti-adhesive coating composition is applied to the optical fiber, which, as noted, is provided with a single-layer or multi-layer protective coating. Thereafter, a dimensionally stable buffer tube is formed around the resulting anti-adhesive coating via an extrusion process in such a manner that a radial intermediate space is defined between the optical fiber provided with an anti-adhesive coating and the inner circumference of the extruded buffer tube. As noted, the application of the anti-adhesive coating to the optical fiber can take place by passing the optical fiber through a bath of liquid adhesive and subsequently curing the adhesive, such as by UV radiation, heating, and/or electron beam radiation.

When the buffer tube is extruded over a single optical fiber, the dimension of the radial intermediate space (i.e., the average radial clearance) is typically between about three microns and 100 microns (e.g., about 20 microns). By way of example, a single-fiber buffer tube having an outer diameter of about 900 microns might be employed to achieve a dry, semi-tight buffered fiber in which the annular space between buffer tube and the anti-adhesive coating (i.e., coating the optical fiber) is between about 10 and 30 microns. Such dry, semi-tight single-fiber units are especially useful as patch cords and data cables.

In the embodiment in which the buffer tube is extruded over a plurality of optical fibers (e.g., a fiber bundle), each provided with a protective coating and a surrounding anti-adhesive coating, the dimension of the radial intermediate space (i.e., the average radial clearance) between the inner circumference of the buffer tube and an imaginary circle (i.e., a hypothetical boundary) around the bundle of optical fibers is at least about 100 microns. In other words, to the extent the plurality of optical fibers is positioned (i.e., aggregated) within the center of the buffer tube in a way that minimizes the optical fibers' collective space (i.e., the combined cross-sectional area), there is typically a minimum 100-micron clearance (i.e., radial width) between the plurality of optical fibers and the inner surface of the buffer tube. Stated otherwise, the minimum cross-sectional inner diameter of the buffer tube is at least about 200 microns greater than the diameter of the aforementioned imaginary circle that is capable of accommodating the optical fiber bundle.

The optical fiber units of the present invention need not employ water-blocking greases or gel-like materials in the radial intermediate space between the anti-adhesive coating and the buffer tube. Consequently, it is believed that the time required to make connections between dry optical fiber units of the present invention will be reduced by about 20-30 percent as compared with making connections between conventional optical fiber units in which greases or gel-like materials are used.

Moreover, it has been unexpectedly discovered that, in accordance with the present invention, the presence of the anti-adhesive coating and the absence of water-blocking greases or gels significantly increases the production rates in which buffer tubes can be satisfactorily extruded over one or more optical fibers as compared with the slower extrusion rates that are necessary when greases and/or gel-like materials are employed in the manufacture of conventional optical fiber units. In this regard, production line speed improvement of up to 40 percent has been observed. Perhaps more importantly, the use of the anti-adhesive coating reduces undesirable sticking of the buffer tube to the one or more optical fibers. It is thought that such adhesion of a buffer tube to an optical fiber can result in degraded optical performance.

Finally, it has been found that an optical fiber unit according to the present invention facilitates the removal of the buffer tube over a length of at least 100 centimeters (e.g., 200 centimeters or more), and even at least 500 centimeters, without damaging the optical fiber's protective coating. In other words, the optical fiber units according to the present invention provide easy stripping without resorting to the inclusion of gel-like materials within the buffer tube.

In the specification and figure, typical embodiments of the invention have been disclosed. The present invention is not limited to such exemplary embodiments. Unless otherwise noted, specific terms have been used in a generic and descriptive sense and not for purposes of limitation.

The invention claimed is:

1. An optical fiber unit, comprising:
   an optical fiber including a central glass fiber surrounded by a protective coating;
   an anti-adhesive coating surrounding said optical fiber, said anti-adhesive coating being at least partially bonded to said protective coating of said optical fiber; and
   a buffer tube surrounding said optical fiber and said anti-adhesive coating to define a radial intermediate space between said anti-adhesive coating and said buffer tube;
   wherein said anti-adhesive coating and said buffer tube are separated by an average radial clearance of at least about three microns; and
   wherein the radial intermediate space between said anti-adhesive coating and said buffer tube is substantially free of material.

2. An optical fiber unit according to claim 1, further comprising one or more additional optical fibers positioned within said buffer tube, each additional optical fiber including a central glass fiber surrounded by a protective coating, wherein each said additional optical fiber is individually surrounded by an anti-adhesive coating; and
   wherein said plurality of optical fibers together with said anti-adhesive coatings can be positioned within said buffer tube to provide an average radial clearance of at least about 100 microns with respect to said buffer tube.

3. An optical fiber unit according to claim 1, wherein said anti-adhesive coating comprises a UV-curable resin.

4. An optical fiber unit according to claim 3, wherein said anti-adhesive coating comprises reactive silicone groups.

5. An optical fiber unit according to claim 1, wherein said anti-adhesive coating comprises pigments and/or colorants.

6. An optical fiber unit according to claim 1, wherein said anti-adhesive coating surrounding said optical fiber is between about one and ten microns thick.

7. An optical fiber unit according to claim 1, wherein said buffer tube comprises thermoplastic elastomer having flexible diol segments.

8. An optical cable comprising a sheath that surrounds one or more optical fiber units according to claim 1.

9. An optical cable, comprising a dimensionally stable tube that surrounds one or more optical fiber units according to claim 1, said optical fiber units being freely positioned within said dimensionally stable tube, and an outer jacket surrounding said dimensionally stable tube.

10. An optical cable according to claim 9, further comprising a central strengthening element around which said dimensionally stable tube is wound.

11. An optical fiber unit according to claim 1, wherein said anti-adhesive coating is substantially bonded to said protective coating of said optical fiber.

12. A dry, semi-tight optical fiber unit that is free of greases or gels, comprising:
    an optical fiber having a central glass fiber surrounded by a protective coating;
    an anti-adhesive coating surrounding said optical fiber, said anti-adhesive coating being substantially bonded to said protective coating of said optical fiber; and
    a buffer tube surrounding said optical fiber and said anti-adhesive coating in a way that defines an annular free space, the average radial clearance between said anti-adhesive coating and said buffer tube being between about three microns and 100 microns.

13. An optical fiber unit according to claim 12, wherein no more than one optical fiber is present within said buffer tube.

14. An optical fiber unit according to claim 13, wherein said anti-adhesive coating surrounding said optical fiber is between about one and ten microns thick.

15. An optical fiber unit according to claim 12, wherein the average radial clearance between said anti-adhesive coating and said buffer tube is between about 10 microns and 30 microns.

16. An optical fiber unit, comprising:
   a buffer tube;
   an optical fiber bundle positioned entirely within said buffer tube, said optical fiber bundle comprising a plurality of optical fibers, each said optical fiber including a central glass fiber surrounded by a protective coating, wherein one or more said optical fibers are individually surrounded by an anti-adhesive coating, each said anti-adhesive coating being at least partially bonded to said protective coating of its respective optical fiber;
   wherein said buffer tube surrounds said optical fiber bundle to define a radial intermediate free space that is substantially devoid of material; and
   wherein an average radial clearance of at least about 100 microns separates said optical fiber bundle and said buffer tube if said optical fiber bundle is centrally positioned within said buffer tube in a way that minimizes the cross-sectional area of the optical fiber bundle and thereby maximizes the radial intermediate free space.

17. An optical fiber unit according to claim 16, wherein said optical fiber bundle comprises a plurality of optical fibers in which one or more said optical fibers are individually surrounded by an anti-adhesive coating, each said anti-adhesive coating being substantially bonded to said protective coating of its respective optical fiber.

18. An optical fiber unit according to claim 16, wherein said optical fiber bundle comprises a plurality of optical fibers in which each said optical fiber is individually surrounded by an anti-adhesive coating that is at least partially bonded to said protective coating of its respective optical fiber.

19. An optical fiber unit according to claim 16, wherein said optical fiber bundle comprises a plurality of optical fibers in which each said optical fiber is individually surrounded by an anti-adhesive coating that is substantially bonded to said protective coating of its respective optical fiber.

20. An optical fiber unit according to claim 16, wherein each said anti-adhesive coating comprises a UV-curable resin.

21. An optical fiber unit according to claim 16, wherein each said anti-adhesive coating comprises reactive silicone groups.

22. An optical fiber unit according to claim 16, wherein each said anti-adhesive coating comprises pigments and/or colorants.

23. An optical fiber unit according to claim 16, wherein each said anti-adhesive coating has a thickness of between about one and ten microns.

24. An optical fiber unit according to claim 16, wherein said buffer tube comprises thermoplastic elastomer having flexible diol segments.

25. An optical cable comprising a sheath that surrounds one or more optical fiber units according to claim 16.

26. An optical cable, comprising a dimensionally stable tube that surrounds one or more optical fiber units according to claim 16, said optical fiber units being freely positioned with said dimensionally stable tube, and an outer jacket surrounding said dimensionally stable tube.

27. An optical cable according to claim 26, further comprising a central strengthening element around which said dimensionally stable tube is wound.

* * * * *